United States Patent [19]  [11]  4,052,374
Baumann  [45]  Oct. 4, 1977

[54] UNSYMMETRICAL 1:2-CHROMIUM COMPLEXES CONTAINING AN AZO COMPOUND AND AN AZOMETHINE COMPOUND

[75] Inventor: Hans Baumann, Ludwigshafen, Germany

[73] Assignee: BASF Aktiengesellschaft, Ludwigshafen, Germany

[21] Appl. No.: 638,959

[22] Filed: Dec. 8, 1975

[51] Int. Cl.$^2$ .............. C09B 45/02; C09B 45/06; C09B 45/16; C09B 45/38
[52] U.S. Cl. .............. 260/145 A; 260/145 B; 260/146 R; 260/146 D; 260/147; 260/148; 260/149; 260/150; 260/151; 106/23; 106/288 Q; 106/308 Q
[58] Field of Search .......... 260/145 A, 145 B, 146 R, 260/146 D, 147, 148, 149, 151, 154, 150

[56] References Cited

U.S. PATENT DOCUMENTS

| | | | |
|---|---|---|---|
| 2,855,393 | 10/1958 | Schetty et al. | 260/145 A |
| 2,985,646 | 5/1961 | Schetty et al. | 260/145 A |
| 3,391,132 | 7/1968 | Beffa et al. | 260/145 A |
| 3,933,785 | 1/1976 | Bach et al. | 260/145 B |

*Primary Examiner*—Floyd D. Higel
*Attorney, Agent, or Firm*—Keil, Thompson & Shurtleff

[57] ABSTRACT

Compounds of the formula:

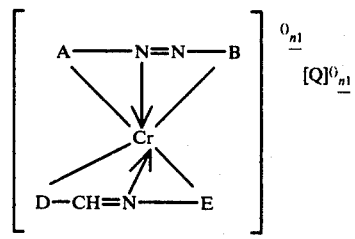

which are eminently suitable for dyeing natural and synthetic polyamides and for coloring surface coatings. Dyeings on textile material are distinguished by very good lightfastness and very good fastness to wet treatments, for example fastness to water, perspiration, sea water and washing.

6 Claims, No Drawings

UNSYMMETRICAL 1:2-CHROMIUM COMPLEXES CONTAINING AN AZO COMPOUND AND AN AZOMETHINE COMPOUND

The invention relates to 1:2-chromium complexes whose anion has the formula (I):

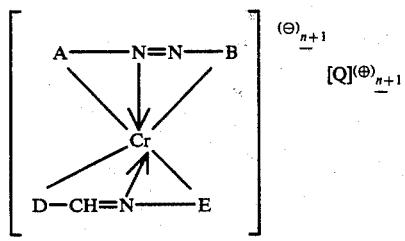

in which

A is the radical of a carbocyclic diazo component having a complex-forming hydroxy group or carboxy group in adjacent position to the azo bridge;

B is the radical of a carbocyclic, heterocyclic or open-chain coupling component having a complex-forming hydroxy or amino group in adjacent position to the azo bridge;

D is the radical of a carbocyclic aldehyde having a complex-forming hydroxy group in adjacent position to the azomethine bridge;

E is an aliphatic radical having a complex-forming hydroxy or carboxy group; Q is a cation; and n is the number of the carboxy groups not participating in the formation of the complex and of sulfonic acid groups.

Examples of suitable cations for the complexes are alkali metal, ammonium or substituted ammonium cations such as sodium, potassium, ammonium, trimethylammonium, tributylammonium, dimethyldibenzylammonium, di-$\beta$-hydroxyethylammonium, $\beta$-ethylhexylammonium, $\gamma$-($\beta$-ethylhexoxy)-propylammonium or isopropoxypropylammonium.

The invention relates particularly to dyes whose anion corresponds to the formula (Ia):

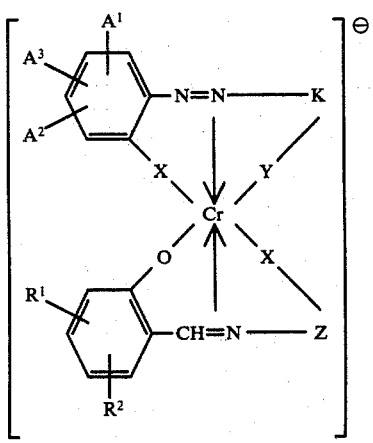

in which $A^1$ is hydrogen, hydroxysulfonyl, chloro, bromo, methyl, methoxy, ethoxy, nitro, methylsulfonyl, ethylusulfonyl, sulfamoyl, N-mono-$C_1$ to $C_4$-alkyl substituted sulfamoyl, N,N-di-$C_1$ to $C_4$-alkyl substituted sulfamoyl, or N-phenylsulfamoyl;

$A^2$ is hydrogen, chloro, nitro or hydroxysulfonyl;

$A^3$ is hydrogen; or $A^1$ and $A^3$ together are a fused benzene ring which may bear nitro as a substituent;

$R^1$ is hydrogen, chloro, bromo, nitro, hydroxysulfonyl, phenylazo optionally bearing chloro, bromo, methyl, methoxy, ethoxy, nitro or hydroxysulfonyl as a substituent, or naphthylazo optionally bearing hydroxysulfonyl as a substituent;

$R^2$ is hydrogen, chloro, bromo or nitro; or $R^1$ and $R^2$ together may form a fused benzene ring;

X is —O- or —COO-;

Y is -O- or —NH- K is

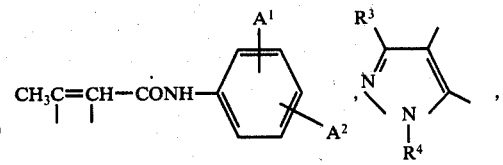

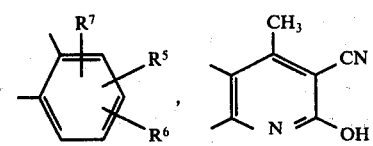

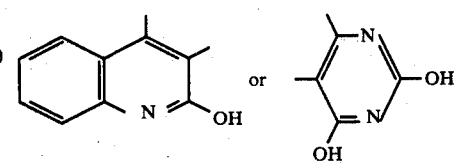

$R^3$ is hydrogen, methyl, phenyl or carbamoyl;

$R^4$ is hydrogen or phenyl optionally bearing methyl, chloro or hydroxysulfonyl as a substituent;

$R^5$ is methyl, methoxy, acetylamino, propionylamino, benzoylamino, N-phenylamino, dimethylamino or diethylamino;

$R^6$ is hydrogen or methyl;

$R^7$ is hydrogen or, when $R^5$ and $R^6$ form a fused benzene ring optionally bearing bromo, amino, hydroxy, phenylamino, acetylamino, propinonylamino, benzoylamino or hydroxysulfonylamino as a substituent, is hydroxysulfonyl;

Z is

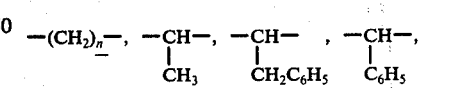

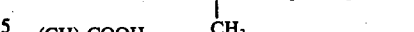

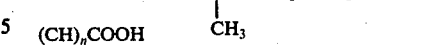

n is one of the integers 1, 2 and 3.

Examples of compounds of the formula:

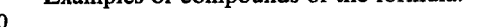

are: diazotizable amines of the benzene or naphthalene series which contain an alkoxy, hydroxy or carboxy group in the ortho-position to the amino group as the complex-forming substituent. Specific examples are: 2-aminophenol, 4-chloro-2-aminophenol, 4-nitro-2-aminophenol, 5-nitro-2-aminophenol, 4,6-dichloro-2-aminophenol, 4,6-dinitro-2-aminophenol, 4-methyl-6-nitro-2-aminophenol, 4-chloro-5-nitro-2-aminoanisole, 4,5-dichloro-2-aminoanisole, 2-aminobenzoic acid, 4-nitro-2-aminobenzoic acid, 2-aminophenol-4-sulfonic acid, 2-aminophenol-4-sulfonic acid, amide, 2-aminophenol-4-sulfonic acid methylamide, 2-aminophenol-4-sulfonic acid phenylamide, 4-chloro-2-aminophenol-6-sulfonic acid, 4-chloro-2-aminoanisole 5-sulfonic acid methylamide, 4-nitro-2-aminophenol-6-sulfonic acid, 6-nitro-2-aminophenol-4-sulfonic acid, 5-nitro-2-aminoanisole-4-sulfonic acid, 1-amino-2-naphthol-4-sulfonic acid, 1-amino-6-nitro-2-naphthol-4-sulfonic acid and 2-amino-1-naphthol-5-sulfonic acid.

Examples of compounds of the formula H-B-H or H-K-YH are: coupling components of the benzene, naphthalene, pyrazole, pyridine, quinoline or pyrimidine series which contain hydroxy or amino groups and also derivatives of 1,3-dicarbonyl compounds. Specific examples are 4-methylphenol, 3,4-dimethylphenol, 4-acetylaminophenol, 4-methyl-3-acethylaminophenol, 3-diethylaminophenol, 4-methyl-3-ethylaminophenol, 3-(o-tolylamino)-phenol, 2-naphthylamine, 2-naphthol, 6-bromo-2-naphthol, 5,8-dichloro-1-naphthol, 1-naphthol-5-sulfonic acid, 2-naphthol-6-sulfonic acid, 1-naphthylamine-4-sulfonic acid, 1-naphthylamine-5-sulfonic acid, 2-naphthylamine-5-sulfonic acid, 2-naphthylamine-6-sulfonic acid, 8-acetylamino-1-naphthol-5-sulfonic acid, 6-phenylamino-1-naphthol-3-sulfonic acid, 7-amino-1-naphthol-3-sulfonic acid, 3-methyl-5-pyrazolone, 1-phenyl-3-methyl-5pyrazolone, 1,3-diphenyl-5-pyrazolone, 1-phenyl-3-carboethoxy-5pyrazolone, 1-(2'-methylphenyl)-3-methyl-5-pyrazolone, 1-(4'-chlorophenyl)-3-methyl-5-pyrazolone, 1-(2',5'-dichlorophenyl)-3-methyl-5-pyrazolone, 1-phenyl-3-methyl-5-pyrazolone-4'-carboxylic acid, 1-phenyl-3-methyl-5-pyrazolone-3'-sulfonic acid, 1-phenyl-3-methyl-5-pyrazolone-4'-sulfonic acid, 1,3-diphenyl-5-pyrazolone-2'-sulfonic acid, 1-(2'-chlorophenyl)-3-methyl-5-pyrazolone-5'-sulfonic acid, 2,4-dihydroxyquinoline, N-acetoacetylcyclohexylamide, N-acetoacetylphenylamide, N-acetoacetyl-(2-chlorophenyl)-amide and N-acetoacetyl-(4-methylphenyl)-amide-2-sulfonic acid.

Examples of compounds of the formulae H-B-CHO and

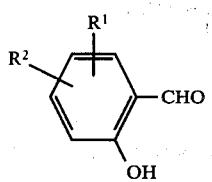

are:
o-hydroxyaldehydes of the benzene and naphthalene series such as 2-hydroxybenzaldehyde, 2-hydroxy-1-naphthaldehyde, 3-nitro-2-hydroxybenzaldehyde, 5-nitro-2-hydroxybenzaldehyde, 5-bromo-2-hydroxybenzaldehyde, 3,5-dinitro-2-hydroxybenzaldehyde, 3,5-dichloro-2-hydroxybenzaldehyde, 2-hydroxy-1-naphthaldehyde-3-carboxylic acid, 2-hydroxybenzaldehyde-5-sulfonic acid, 5-(2',5'-dichlorophenylazo)-2-hydroxybenzaldehyde, 5-(2'-methoxyphenylazo)-2-hydroxybenzaldehyde-5'-sulfonic acid and 5-(2'-chlorophenylazo)-2-hydroxybenzaldehyde-5'-sulfonic acid.

Examples of compounds of the formulae H—E—NH$_2$ and HX—Z—NH$_2$ are:
aliphatic amines which contain a complex-forming hydroxy group or carboxylic acid group in the 2- or 3-position to the amino group such as 1-aminoethanol-2, 1-aminopropanol-2, 1-aminopropanol-3, 3-amino-3-methylbutanol-1, 2-aminoacetic acid, 2-aminopropinoic acid, 3-aminopropionic acid, 2-amino-3-hydroxypropionic acid, 2-amino-3-phenylpropionic acid, 2-aminobutyric acid, aminosuccinic acid and 2-aminoglutaric acid.

The 1:2-chromium complexes may be prepared stepwise starting from the 1:1-chromium comples of the azo compounds which may be obtained by known methods.

The reaction of the 1:1-chromium complexes with the azomethine compounds or their individual components is carried out in aqueous solution or suspension, with or without the addition of an organic solvent, for example an alcohol or carboxamide. The formation of the 1:2-complex is carried out in a weakly acid to alkaline range, preferably at a pH of from 6 to 9 and at elevated temperature, for example at from 50° C to the boiling temperature.

The 1:2-complex formed is isolated by acidification, salting out with an alkali metal salt or by evaporation, water-soluble complex salts being obtained. In order to prepare water-insoluble organophilic dyes the complex is precipitated from aqueous solution with a suitable nitrogenous base which yields the cation.

The nitrogenous bases used for the production of these solvent dyes may be long-chain alkylamines or cycloalkylamines preferably having from six to sixteen carbon atoms such as 2-ethylhexylamine, di-(2-ethylhexyl)-amine, 3-(2'-ethylhexoxy)-propylamine, dodecylamine, isotridecylamine, oleylamine, dicyclohexylamine, N,N'-diphenylganidine, N,N'-di-(2-methylphenyl)-guanidine, phenylbiguanide, 4-chlorophenylbiguanide or (2-methylphenyl)-biguanide.

The dyes are suitable for dyeing or printing natural or synthetic nitrogenous materials such as wool, polyamide or polyurethane fibers.

The salts of the dyes with amine bases which are insoluble in water but soluble in organic solvents may be used for the coloration of organic liquids, resins or surface coatings, wood stains and ball pen fluids, for coloring anodically oxidized aluminum or as dyes for dope dyeing, for example for the production of colored cellulose ester or polyamide fibers.

Particular technical importance attaches to dyes whose anions correspond to the formula (Ib) or (Ic):

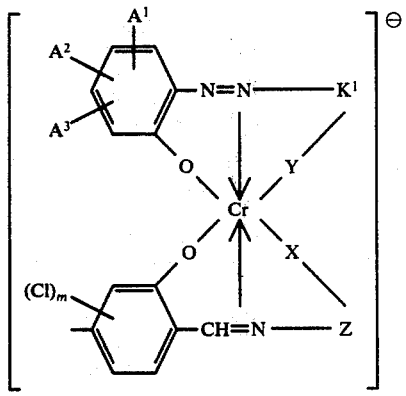

(Ib)

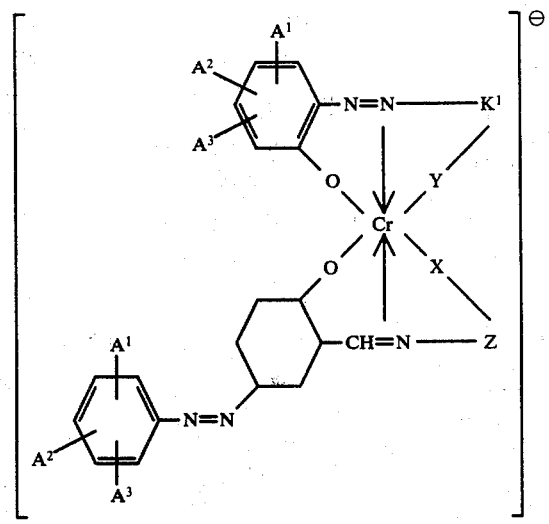

(Ic)

in which m is zero or one of the integers 1 and 2;

K¹ is a radical of the formula:

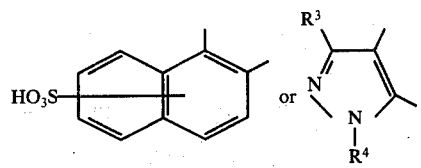

and $A^1$, $A^2$, $A^3$, X, Y, Z, $R^3$ und $R^4$ have the above meanings.

$R^3$ is preferably methyl and $R^4$ is preferably phenyl which is optionally substituted by methyl, chloro and/or hydroxysulfonyl.

$A^1$ is preferably hydroxysulfonyl, chloro or nitro; $A^2$ is preferably hydrogen, chloro, nitro or hydroxysulfonyl; $A^1$ and $A^3$ may together be a fused-on benzene ring which optionally bears nitro as a substituent; and Z is preferably $$-CH_2-, \quad -CH_2-CH_2-, \quad \underset{CH_3}{\underset{|}{CH-}} \quad \text{or} \quad \underset{CH_3}{\underset{|}{-CH-CH_2-}}.$$

The following Examples illustrate the invention; reference to parts and percentages are by weight unless stated otherwise.

EXAMPLE 1

22 parts of 5-phenylazo-2-hydroxybenzaldehyde-4-sulfonic acid is stirred into 300 parts of water, 6.4 parts of aminoacetic acid is added and the whole is adjusted to pH 7.5 with aqueous caustic soda solution and heated to 70° C. An orange solution is obtained into which 35 parts of the 1:1-chromium complex compound of the azo dye 5-nitro-2-aminophenol→ 2-naphthylamine-5-sulfonic acid is gradually introduced while stirring. The original pH is maintained by adding more caustic soda solution.

The addition of the azomethine compound to the 1:1-chromium complex compound may be monitored by thin layer chromatography.

When the formation of the 1:2-complex compound is completed it is salted out with 50 parts of potassium chloride and 100 parts of sodium chloride, cooled, suction filtered and dried. 83 parts of a complex salt is obtained whose monoanion corresponds to the formula:

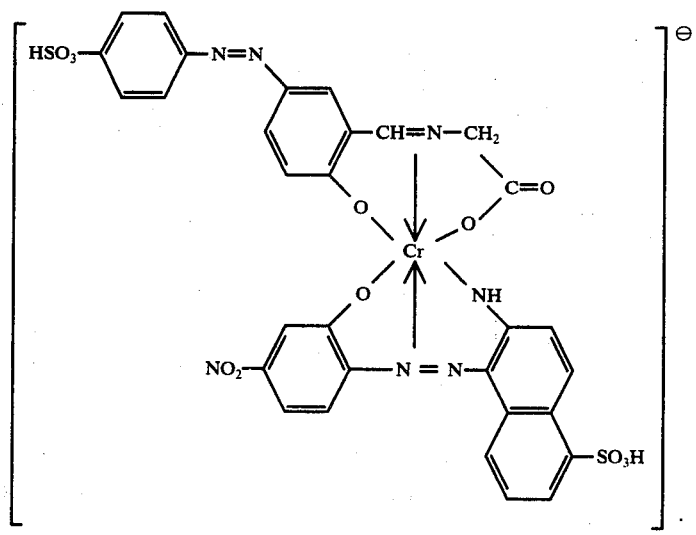
It dyes wool and synthetic polyamides yellowish green hues having very good light and wet fastness properties.
The following complexes, identified by the starting materials, are obtained analogously:
| Ex | 1:1-complex of | Azomethine | Color on wool |
|---|---|---|---|
| 2 | | | olive |
| 3 | | | olive green |
| 4 | | | olive green |
| 5 | | | yellow |
| 6 | | | brown |

-continued

| Ex | 1:1-complex of | Azomethine | Color on wool |
|---|---|---|---|
| 7 | (structure: naphthol-azo-phenol-azo-naphthalenesulfonic acid with HSO₃, OH, HO groups) | (structure: OCH₃, NH₂—SO₂ substituted phenyl-N=N-phenyl with CH=N-CH(CH₂-COOH)(C=O-OH), OH) | olive brown |
| 8 | (structure: OCH₃, Cl-substituted phenyl-N=N-naphthol with HO, SO₃H) | (structure: SO₃H, CH₃-substituted phenyl-N=N-phenyl with CH=N—(CH₂)₂—HO, OH) | violet |

EXAMPLE 9

140 parts of the 1:1-chromium complex of the azo dye 1-amino-2-naphthol-4-sulfonic acid → 1-phenyl-3-methyl-5-pyrazolone-3'-sulfonic acid and 16.5 parts of 2-aminoethanol are dissolved in 100 parts of water at 65° C. 32 parts of salicylaldehyde is added while stirring and a pH of 8.5 is set up by adding an aqueous solution of caustic soda. The whole is stirred at 65° to 75° C until thin layer chromatographic control indicates the end of the formation of the 1:2-chromium complex. Neutralization with acetic acid is followed by the addition of 400 parts of sodium chloride and the precipitated dye is isolated by filtration and dried.

240 parts of a dye is obtained whose complex monoanion corresponds to the formula:

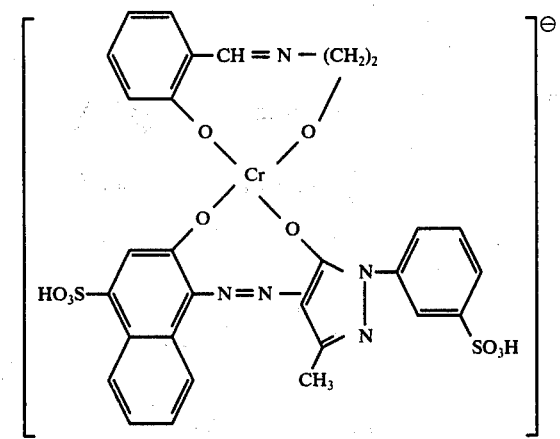

Dyeings obtained on wool or synthetic polyamides are red and have good light and wet fastness properties.

The following complexes are obtained analogously:

| Ex | 1:1 chromium complex of: | Azomethine | Color on wool |
|---|---|---|---|
| 10 | (structure: HSO₃, OH, HO-substituted naphthalene-azo-pyrazolone-phenyl-SO₃H with CH₃) | (structure: NO₂-substituted phenyl with CH=N-CH(CH₂-phenyl)(C=O-OH), OH, HO) | red |
| 11 | " | (structure: naphthol with CH=N—(CH₂)₃—HO, OH) | red |

-continued

| Ex | 1:1 chromium complex of: | Azomethine | Color on wool |
|---|---|---|---|
| 12 | [structure: naphthalene with OH, HSO₃, azo linkage to pyrazolone-type with CH₃, HO, N-phenyl bearing C₂H₅] | " | red |
| 13 | [structure: naphthalene with OH, HSO₃, NO₂, azo linkage with CH₃, HO, N, to chlorophenyl with SO₃H] | 3,5-dichloro-2-hydroxybenzaldehyde azomethine with glycine (CH=N—CH₂—COOH, OH) | red |
| 14 | [structure: benzene with COOH, HO₃S, azo linkage with CH₃, HO, N-phenyl] | salicylaldehyde azomethine with alanine (CH=N—CH(CH₃)—COOH, OH) | yellow |
| 15 | [structure: nitrophenol azo-coupled to aminonaphthalene sulfonic acid; OH, NO₂, NH₂, SO₃H] | salicylaldehyde azomethine with ethanolamine: CH=N—(CH₂)₂—OH, OH | green |
| 16 | [structure: naphthalene with OH, HSO₃ azo-coupled to 2-hydroxynaphthalene] | 4-diethylamino-2-hydroxybenzaldehyde azomethine with glycine: (C₂H₅)₂N—Ar(OH)—CH=N—CH₂—COOH | bluish green |
| 17 | " | salicylaldehyde azomethine with ethanolamine: CH=N—(CH₂)₂—OH, OH | blue |
| 18 | " | 2-hydroxynaphthaldehyde azomethine with alanine: Ar(OH)—CH=N—CH(CH₃)—COOH | greenish blue |

| Ex | 1:1 chromium complex of: | Azomethine | Color on wool |
|---|---|---|---|
| 19 | [structure: naphthol with SO3H, OH, HSO3, azo to naphthol] | [structure: CH=N-CH(CH2-C6H5)(C=O), with OH, HO] | greenish blue |
| 20 | [structure: HSO3, OH, HO, N=N, N(C2H5)2, NO2 on naphthalene] | [structure: CH=N-CH(CH3)(CH2), with OH, HO] | olive |

EXAMPLE 21

47 parts of the 1:1-chromium complex compound of the azo dye 1-amino-2-naphthol-4-sulfonic acid → 1-phenyl-3-methylpyrazolone-5 is stirred into a mixture of 200 parts of ethanol and 150 parts of water and dissolved at 60° C by adjusting the pH to 7.2 with an aqueous solution of caustic soda. 16.5 parts of X-nitrosalicylaldehyde (mixture of the 3 and 5 isomers) and 8 parts of aminoacetic acid are added and the pH is maintained at 7.2 by adding more caustic soda solution. After the formation of the 1.2-complex has been completed a solution of 38 parts of 3-(2'-ethylhexoxy)-propylamine-1 and 15 parts of acetic acid in 150 parts of water is allowed to drip in at 40° C while stirring and then the organic solvent is evaporated. The precipitated amine salt of the 1:2-chromium complex is filtered off, washed with water and dried. It dissolves in benzyl alcohol with a pure red color and may be used for the production of red ink for ball point pens.

| Ex. | 1:1-chromium complex of | Azomethine | Nitrogenous base (Hue) |
|---|---|---|---|
| 22 | [structure: HSO3, OH, HO, N=N, NO2, N-phenyl pyrazolone with CH3] | [structure: Cl, CH=N-CH(CH3)(CH2), Cl, OH, HO] | dicyclohexylamine (orange) |
| 23 | [structure: HSO3, OH, HO, bis-naphthyl azo] | [structure: CH=N-(CH2)2-C=O, OH, HO] | 3'-(2'-ethyl-hexoxy)-propyl-amine-1 (blue) |
| 24 | [structure: HSO3, OH, HO, N=N, Cl, CH3, C=O, NH-phenyl] | [structure: (C2H5)2N-phenyl-CH=N-(CH2)3, HO, OH] | diphenylguanidine (yellow) |

-continued

| Ex. | 1:1-chromium complex of | Azomethine | Nitrogenous base (Hue) |
|---|---|---|---|
| 25 | 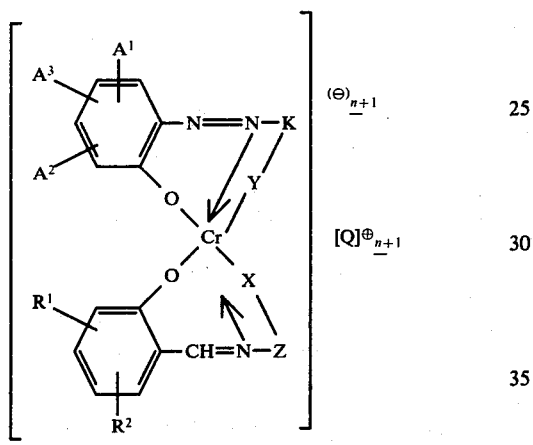 | | dodecylamine (green) |

I claim:
1. A dye of the formula:

in which
A¹ is hydrogen, hydroxysulfonyl, chloro, bromo, methyl, methoxy, ethoxy, nitro, methylsulfonyl, ethylsulfonyl, sulfamoyl, an N-mono-$C_1$-$C_4$-alkyl or N,N-di-$C_1C_4$-alkyl substituted sulfamoyl, or N-phenylsulfamoyl;
A² is hydrogen, chloro, nitro or hydroxysulfonyl;
A³ is hydrogen; or
A¹ and A³ taken together with the attached phenylene moiety form naphthalene with or without a fused benzene ring nitro as a substituent;
R¹ is hydrogen, chloro, bromo, nitro, hydroxysulfonyl, phenylazo with or without chloro, bromo, methyl, methoxy, ethoxy, nitro or hydroxysulfonyl as a substituent or naphthylazo with or without hydroxysulfonyl as a substituent;
R² is hydrogen, chloro, bromo or nitro; or
R¹ and R² together with the attached phenylene moiety form naphthalene;
X is —O— or —COO—;
Y is —O— or —NH—;
K is R³ is hydrogen, methyl, phenyl or carbamoyl;
R⁴ is hydrogen or phenyl with or without methyl, chloro or hydroxysulfonyl as a substituent;
R⁵ is methyl, methoxy, acetylamino, propionylamino, benzoylamino, N-phenylamino, dimethylamino or diethylamino;
R⁶ is hydrogen or methyl;
R⁷ is hydrogen or, when R⁵ and R⁶ taken together with the attached phenylene moiety form naphthalene with or without bromo, amino, hydroxy, phenylamino, acetylamino, propionylamino, benzoylamino or hydroxysulfonyl as a substituent, R⁷ is hydrogen or hydroxysulfonyl;
Z is $-(CH_2)_n-$, $-CH-$, $-CH-$, $-CH-$,
                  |         |          |
                  $CH_3$    $CH_2C_6H_5$  $C_6H_5$ $-CH-$       or  $-CH-CH_2CH_2-$;
|                 |
$(CH_2)_n$COOH   $CH_3$ Q is a cation; and
n is one of the integers 1, 2 and 3.
2. A dye as claimed in claim 1 whose anion corresponds to the formula (Ib):

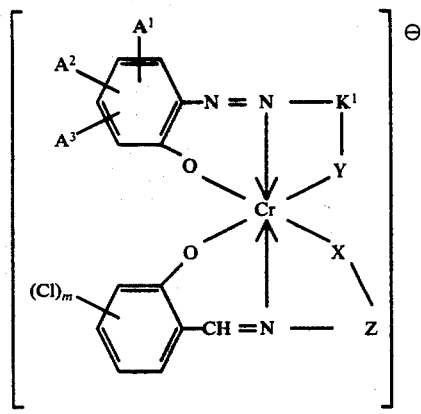

in which m is zero, 1 or 2;

$K^1$ is a radical of the formula:

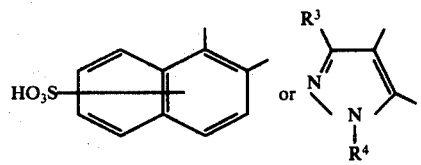

and $A^1$, $A^2$, $A^3$, X, Y, Z, $R^3$ and $R^4$ have the meanings given in claim 1.

3. A dye is claimed in claim 1 whose anion corresponds to the formula

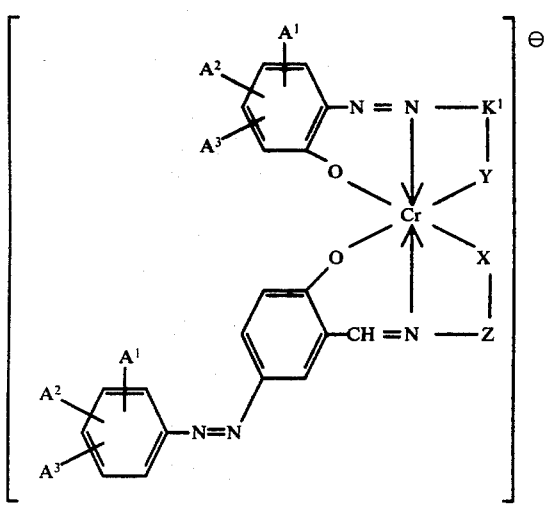

in which $K^1$ is a radical of the formula

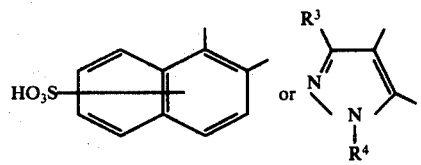

and $A^1$, $A^2$, $A^3$, X, Y, Z, $R^3$ and $R^4$ have the meanings given in claim 1.

4. The compound as claimed in claim 1 whose anion corresponds to the formula:

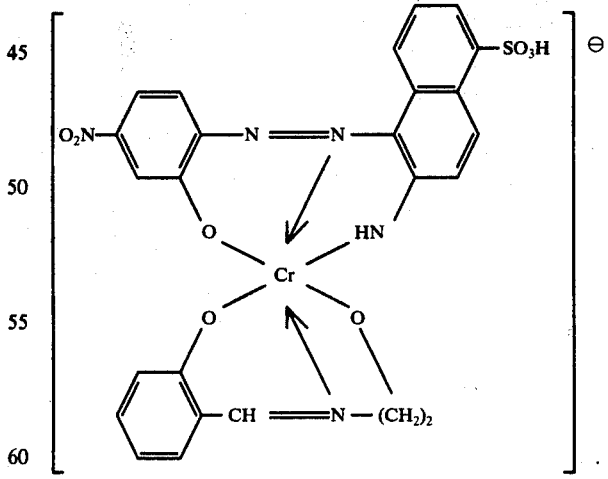

5. The compound as claimed in claim 1 whose anion corresponds to the formula:

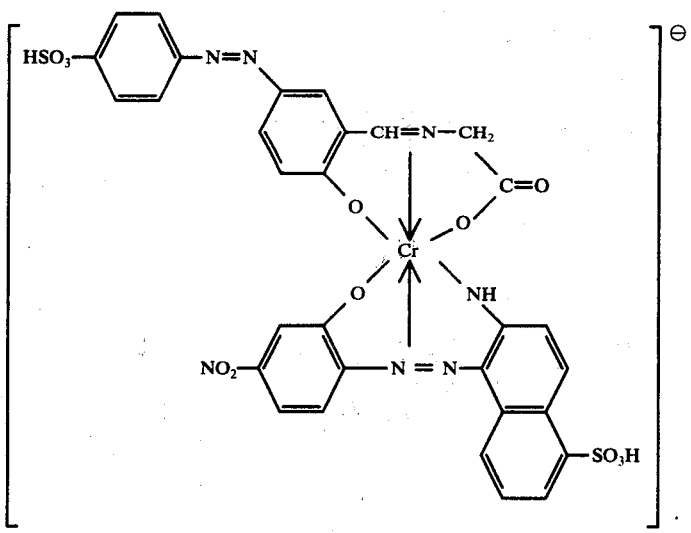
6. The compound as claimed in claim 1 whose anion corresponds to the formula:
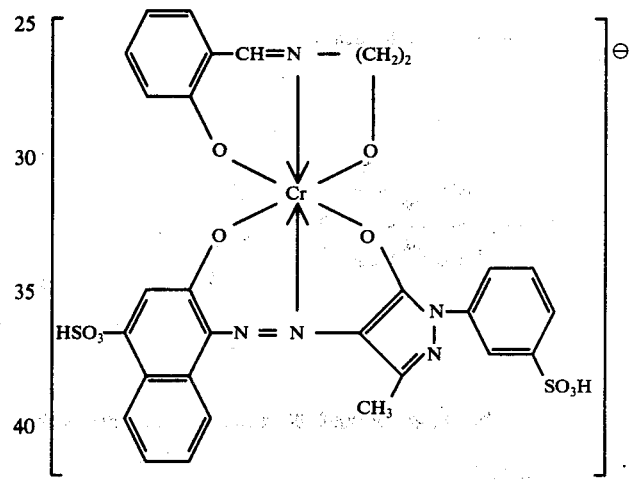
* * * * *

UNITED STATES PATENT AND TRADEMARK OFFICE
CERTIFICATE OF CORRECTION

PATENT NO. : 4,052,374
DATED : October 4, 1977
INVENTOR(S) : Hans Baumann

It is certified that error appears in the above-identified patent and that said Letters Patent are hereby corrected as shown below:

On the front page, after

[22] Filed: December 8, 1975, the following line should be inserted:

-- [30] Foreign Application Priority Data

December 24, 1974  Germany ........ 2461481 --

In column 16, line 2 of Claim 2, after

"formula", delete --(Ib)--.

Signed and Sealed this

Twenty-fourth Day of October 1978

[SEAL]

Attest:

RUTH C. MASON
Attesting Officer

DONALD W. BANNER
Commissioner of Patents and Trademarks